United States Patent

Coty

Patent Number: 4,535,914
Date of Patent: Aug. 20, 1985

[54] AUTOMATIC LARVICIDE DISPENSER

[76] Inventor: Raymond J. A. Coty, P.O. Box 1954, New Britain, Conn. 06050

[21] Appl. No.: 581,790

[22] Filed: Feb. 21, 1984

[51] Int. Cl.³ .............................................. B67D 5/08
[52] U.S. Cl. .................................... 222/52; 137/78.1; 417/14
[58] Field of Search ...................... 222/52, 54, 53, 63, 222/409, 340, 341; 137/78.1, 78.3, 78.5, 79, 81; 417/1, 14

[56] References Cited

U.S. PATENT DOCUMENTS

| | | | |
|---|---|---|---|
| 3,214,061 | 10/1965 | Mills | 222/54 |
| 3,654,953 | 4/1972 | Hagdorn | 137/395 |
| 3,937,440 | 2/1976 | MacGregor et al. | 251/61.1 |
| 4,023,772 | 5/1977 | Ratelband | 251/5 |
| 4,050,669 | 9/1977 | Brumm | 251/5 |
| 4,182,357 | 1/1980 | Ornstein | 137/78.3 |

*Primary Examiner*—Joseph J. Rolla
*Assistant Examiner*—Kenneth Noland
*Attorney, Agent, or Firm*—Henderson & Sturm

[57] ABSTRACT

An automatic larvicide dispensing apparatus which is actuated by weather conditions. A container for holding liquid larvicide has a sealed cylinder disposed therein and a piston reciprocally disposed within such cylinder. This piston is biased to one position within the cylinder and is movable to a second position. A leather strap, or other actuator having similar properties, allows the piston to move to the first position thereof when weather is wet and shrinks to push the piston to the second position when weather conditions are dry. The cylinder has one-way valves associated therewith to act as a pump for loading the cylinder during wet conditions and dispensing the larvicide from the cylinder during dry conditions.

5 Claims, 4 Drawing Figures

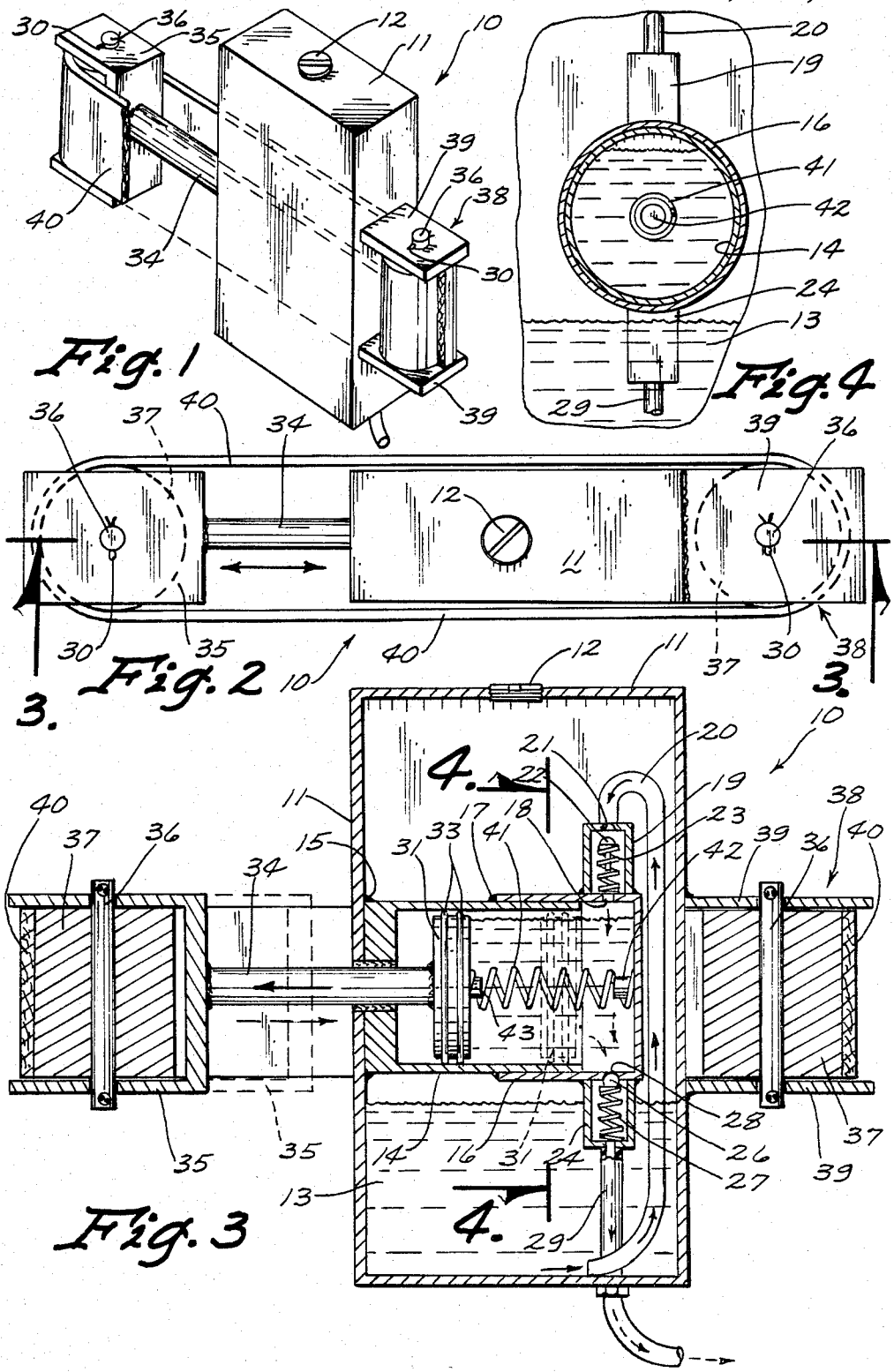

AUTOMATIC LARVICIDE DISPENSER

TECHNICAL FIELD

The present invention relates generally to an apparatus for dispensing larvicide, and more particularly to an automatic larvicide dispensing apparatus which is operated solely by changing weather conditions.

BACKGROUND ART

It is well known that many insects lay eggs on stagnant water and that these eggs eventually turn into larva and then ultimately hatch into an adult insect. Consequently, these insects can be controlled by killing the larva on stagnant waters. This is, for example, a common way to control the common mosquito.

A problem with killing the larva with a larvicide is that if it is applied to standing water during or just after a rain, when the water is flowing freely, the larvicide will be washed away and will be wasted. Consequently, it is desirable to apply such larvicide some reasonable time after a rain, after the water has stopped flowing freely. It is also desirable, of course, to apply such larvicide during dry weather to such standing water.

Normally this application of larvicide to standing pools of water is done manually, because if it were applied by an apparatus on a time basis or the like, it could obviously be wasted if weather conditions were not right.

Consequently, there is a need for an apparatus for automatically dispensing larvicide which will dispense such larvicide during dry weather conditions which follow wet weather conditions.

DISCLOSURE OF THE INVENTION

The present invention relates to an automatic larvicide dispensing apparatus which is actuated by weather conditions. A container for holding liquid larvicide has a sealed cylinder disposed therein and a piston reciprocally disposed within such cylinder. The piston is biased to one position within the cylinder and is movable to a second position. A leather strap, or other actuator having similar properties, allows the piston to move to the first position thereof when weather is wet and shrinks to push piston to the second position when weather conditions are dry. The cylinder has one-way valves associated therewith to act as a pump for loading the cylinder during wet conditions and dispensing the larvicide from the cylinder during dry conditions.

An object of the present invention is to provide a larvicide dispensing apparatus which is actuated by weather conditions.

Another object of the invention is to provide an automatic larvicide dispensing apparatus which dispenses liquid larvicide only after a sequence of first wet weather and then dry weather.

A further object of the present invention is to provide an automatic larvicide dispensing apparatus the type mentioned above which operates very slowly so that larvicide is not wasted.

Other objects, advantages, and novel features of the present invention will become apparent from the following detailed description of the invention when considered in conjunction with the accompanying drawings.

BRIEF DESCRIPTION OF THE DRAWINGS

FIG. 1 shows a perspective view of a larvicide dispensing apparatus constructed in accordance with the present invention;

FIG. 2 shows a top view of the larvicide dispensing apparatus shown in FIG. 1;

FIG. 3 is a cross-sectional view taken along line 3—3 of FIG. 2; and

FIG. 4 is a partial cross-sectional view taken along line 4—4 of FIG. 3.

BEST MODE FOR CARRYING OUT THE INVENTION

Referring now to the drawings wherein like reference numerals designate identical or corresponding parts throughout the several views, FIG. 1 shows an automatic larvicide dispensing apparatus (10) constructed in accordance with the present invention. The apparatus (10) has a container (11) having a threaded opening in the top which with a closure (12) therefor so that larvicide (13) is shown only about one-third up of the length of the container (11). It will be understood to those skilled in the art that the container (11) can be filled completely to the top.

Disposed within the container (11) is a cylinder (14) which is welded by a weld (15) to the side of the container (11). A cap or auxiliary cylinder (16) is disposed over the top of the cylinder (14) and is welded in place by a weld (17). An inlet opening (18) is in fluid communication with a one-way valve (19) and this one-way valve (19) is in fluid communication with a inlet tube (20) through an opening (21). The valve (19) has a valve head (22) and a compression spring (23), the operation of which will be referred to below.

Attached to the bottom of the member (16) is another one-way valve (24); and, this one-way valve (24) has a valve head (26) and a compression spring (27) for biasing the valve head (26) against the seat forming an opening (28) into the interior of the cylinder formed by the members (14) and (16). A discharge tube (29) is in fluid communication with the one-way valve (24).

A piston (31) is sealingly disposed for reciprocal movement within the cylinder (14) and has seals (33) disposed on the exterior thereof. This piston (31) has a piston rod (34) rigidly attached thereto. The other end of the piston rod (34) has a roller housing (35) rigidly attached thereto. This roller housing (35) has a pin (36) attached thereto and a roller (37) freely rotatable about the pin (36). Cotter keys (30) hold the pins (36) in place. A similar roller structure (38) is disposed on the other side and is rigidly attached to the side of the container (11) and includes members (39) having a pin (36) attached thereto and a roller (37) rotatably disposed around the pin.

In the preferred embodiment shown in the drawings, a leather endless strap (40) is disposed around the rollers (37) and is held from slipping off of the rollers by means of the members (39) and (35) which extend beyond the edges of the leather strap (40).

A compression spring (41) is disposed within the cylinder (14) and is held in place in the interior of the cylinder by means of a projection (42) attached to the inside of the cylinder member (16) and by another projection (43) which is disposed on the end of the piston (31).

In operation, the present invention is installed above a catch basin or other body of water upon which it is desired to apply larvicide in an automatic fashion. For example, this apparatus (10) can be disposed between the grates of a storm sewer or the like. After the apparatus is installed in an appropriate place, then it will be assumed that the leather strap (40) is dry at that time and consequently will be in the position shown in dashed lines in FIG. 3. Then when it rains, the leather strap (40) will be allowed to stretch because it is wet and the compression spring (41) will tend to push the piston (31) out to the position shown in solid lines in FIG. 3. It is parenthetically noted that the cylinder portion on the right side of the piston as shown in FIG. 3 could be filled with sponge rubber or cellulose in order to help act as a spring and to soak up larvicide within the cylinder. In any event, when the piston (31) moves from the position shown in dashed lines in FIG. 3, to the position shown in the solid lines in FIG. 3, the larvicide (13) will be drawn up through the tube (20), past the valve head (21) and through the opening (18), to fill the inside of the cylinder (14) to the right of the piston (31) with larvicide as shown in FIG. 3. Then when weather conditions become dry, the leather strap (40) will slowly shrink as it dries out and this shrinking action of the leather strap (40) will move the piston (31) back to the position shown in dashed lines in FIG. 3. When this movement of the piston (31) occurs, the liquid to the right of cylinder (31), as shown in FIG. 3, will be pushed out past the valve head (26) and ultimately out the discharge tube (29), to be applied upon stagnant water. The next time there is a rain, the above procedure will repeat itself, i.e., the piston will first move to the left to suck larvicide into the cylinder from the container (11) and then during dry periods will push out the larvicide within the cylinder to be applied to water to kill larva.

This apparatus (10) is depended upon the weather to operate. The procedures are very slow. In ideal conditions, it may take up to four hours for the larvicide to be applied upon the stagnant waters. The size of the pump and the length of the leather strap (40) will determine the amount of larvicide which will be dispensed upon the waters. Once the container (11) is empty, the apparatus (10) can be discarded or refilled. In the average catch basin located in the northeastern part of the United States, one application may suffice, but in most southern states of the United States, two applications per year will probably be needed.

Obviously, many modifications and variations of the present invention are possible in light of the above teachings. For example, many parts of animals and trees have the ability to expand when wet and shrink upon drying, and such materials can be substituted for the leather strap (40) to trigger the present invention. It is therefore to be understood that, within the scope of the appended claims, the invention may be practiced otherwise than as specifically described.

I claim:

1. An automatic larvicide pump dispenser comprising:
   container means for holding liquid larvicide;
   a discharge port connected to said container means;
   a sealed cylinder disposed within said container;
   a piston reciprocally disposed within said cylinder and being sealed at the edges thereof against the inside of said cylinder, said piston being movable between a first and second reciprocal position within said cylinder;
   means for biasing said piston to a first position within said cylinder;
   first conduit means for communicating the supply of liquid larvicide in said container means with said cylinder;
   a first one-way valve means disposed within said first conduit means for permitting flow of liquid to flow from the container means to said cylinder when said piston is moved from the second position to the first position thereof, and preventing flow through said first conduit means at all other times;
   second conduit means for communicating the inside of said cylinder with said discharge port;
   a second one-way valve means disposed in said second conduit means for permitting flow from said cylinder to said discharge port when said piston is moved from the first to the second position thereof and preventing flow of liquid through said second conduit means at all other times;
   a piston rod connected to said piston and extending out of said cylinder and out of said container means; and
   actuator means operably connected to said piston rod and to said container means which lengthens when it becomes wet and shortens when it becomes dry whereby said piston will be pushed to said first position by said biasing means when said actuator means is wet and whereby said piston will be pushed to said second position thereof, against the force of the biasing means, as said actuator means becomes dry.

2. The dispenser of claim 1 wherein said actuator means comprises a strip of leather disposed in an endless loop around said container means and said piston rod.

3. The dispenser of claim 2 including roller means attached to the end of said piston rod for reducing frictional movement of said strip of leather against said piston rod.

4. The dispenser of claim 3 including a second roller means attached to the side of the container means, opposite the side from where the piston extends outwardly from, for receiving a part of the strip of leather and reducing frictional contact between the strip of leather and the container means.

5. The dispenser of claim 4 including means on said first and second roller means for preventing the strip of leather from moving laterally off of said first and second roller means.

* * * * *